(12) United States Patent
Paydavosi

(10) Patent No.: US 12,272,324 B2
(45) Date of Patent: Apr. 8, 2025

(54) DRIVE SCHEME FOR IMPROVED COLOR GAMUT IN COLOR ELECTROPHORETIC DISPLAYS

(71) Applicant: E INK CORPORATION, Billerica, MA (US)

(72) Inventor: Sarah Paydavosi, Winchester, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/586,740

(22) Filed: Feb. 26, 2024

(65) Prior Publication Data

US 2024/0290290 A1 Aug. 29, 2024

Related U.S. Application Data

(60) Provisional application No. 63/448,870, filed on Feb. 28, 2023.

(51) Int. Cl.
*G09G 3/34* (2006.01)
*G02F 1/1677* (2019.01)
*G09G 3/20* (2006.01)

(52) U.S. Cl.
CPC ........... *G09G 3/344* (2013.01); *G02F 1/1677* (2019.01); *G09G 3/2092* (2013.01); *G09G 2310/06* (2013.01); *G09G 2310/065* (2013.01); *G09G 2310/068* (2013.01); *G09G 2320/0242* (2013.01); *G09G 2320/0257* (2013.01)

(58) Field of Classification Search
CPC .. G09G 3/344; G09G 3/2092; G09G 2310/06; G09G 2320/0242; G09G 2320/0257; G09G 3/2003; G09G 2310/065; G09G 2310/068; G02F 1/1677
See application file for complete search history.

(56) References Cited

U.S. PATENT DOCUMENTS

| 4,418,346 A | 11/1983 | Batchelder |
| 5,649,083 A | 7/1997 | Barkans |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,880,857 A | 3/1999 | Shiau |
| 5,930,026 A | 7/1999 | Jacobson |
| 6,054,071 A | 4/2000 | Mikkelsen, Jr. |

(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

(Continued)

*Primary Examiner* — Patrick N Edouard
*Assistant Examiner* — Joseph P Fox
(74) *Attorney, Agent, or Firm* — Brian D. Bean

(57) ABSTRACT

Waveforms for driving an electrophoretic display including a color filter between a viewer and the electrophoretic medium. Because the waveform results in each image update visiting the white state before the final state, the overall gamut is larger in aggregate and more predictable than simply driving the electrophoretic display including a color filter with the waveforms that are used for black and white grayscale displays.

14 Claims, 14 Drawing Sheets
(7 of 14 Drawing Sheet(s) Filed in Color)

(56) References Cited

U.S. PATENT DOCUMENTS

| | | |
|---|---|---|
| 6,055,091 A | 4/2000 | Sheridon |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert et al. |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |
| 6,301,038 B1 | 10/2001 | Fitzmaurice |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,179,365 B2 | 5/2012 | Lee et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,024,862 B2 | 5/2015 | Rhodes |
| 9,082,352 B2 | 7/2015 | Cheng et al. |
| 9,170,467 B2 | 10/2015 | Whitesides et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,279,906 B2 | 3/2016 | Kang |
| 9,299,294 B2 | 3/2016 | Lin et al. |
| 9,373,289 B2 | 6/2016 | Sprague et al. |
| 9,390,066 B2 | 7/2016 | Smith |
| 9,390,661 B2 | 7/2016 | Chiu et al. |
| 9,412,314 B2 | 8/2016 | Amundson et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,966,018 B2 | 5/2018 | Gates et al. |
| 10,229,641 B2 | 3/2019 | Yang et al. |
| 10,319,313 B2 | 6/2019 | Harris et al. |
| 10,339,876 B2 | 7/2019 | Lin et al. |

(56) References Cited

U.S. PATENT DOCUMENTS

| | | |
|---|---|---|
| 10,444,553 B2 | 10/2019 | Laxton |
| 10,672,350 B2 | 6/2020 | Amundson et al. |
| 11,049,463 B2 | 6/2021 | Lin et al. |
| 11,520,202 B2 | 12/2022 | Paydavosi et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0109172 A1* | 4/2009 | Lee .................. G09G 3/344 345/107 |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0005720 A1 | 1/2015 | Zang et al. |
| 2015/0262255 A1 | 9/2015 | Khajehnouri |
| 2016/0012710 A1 | 1/2016 | Lu et al. |
| 2016/0140910 A1 | 5/2016 | Amundson |
| 2016/0180777 A1 | 6/2016 | Lin et al. |
| 2021/0389637 A1* | 12/2021 | Paydavosi .............. G09G 3/344 |

OTHER PUBLICATIONS

Wood, D., "An Electrochromic Renaissance?" Information Display, 18(3), 24 (Mar. 2002).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

European Patent Office "International Search Report and Written Opinion", PCT/US2024/017229, May 31, 2024.

\* cited by examiner

DRIVE SCHEME FOR IMPROVED COLOR GAMUT IN COLOR ELECTROPHORETIC DISPLAYS

RELATED APPLICATIONS

This application claims priority to U.S. Provisional Patent Application No. 63/448,870, filed Feb. 28, 2023. The contents of all applications, patents, and publications are incorporated by reference in their entireties.

SUBJECT OF THE INVENTION

This invention relates to methods for driving electro-optic displays. More specifically, this invention relates to driving methods for reducing pixel edge artifacts and/or image retentions in electro-optic displays.

BACKGROUND

Electro-optic displays typically have a backplane provided with a plurality of pixel electrodes, each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of a phenomenon known as "blooming".

Blooming refers to the tendency for application of a drive voltage to a pixel electrode to cause a change in the optical state of the electro-optic medium over an area larger than the physical size of the pixel electrode. Although excessive blooming should be avoided (for example, in a high-resolution active matrix display one does not wish application of a drive voltage to a single pixel to cause switching over an area covering several adjacent pixels, since this would reduce the effective resolution of the display) a controlled amount of blooming is often useful. For example, consider a black-on-white electro-optic display which displays numbers using a conventional seven-segment array of seven directly driven pixel electrodes for each digit. When, for example, a zero is displayed, six segments are turned black. In the absence of blooming, the six inter-pixel gaps will be visible. However, by providing a controlled amount of blooming, for example as described in U.S. Pat. No. 7,602,374, which is incorporated herein in its entirety, the inter-pixel gaps can be made to turn black, resulting in a more visually pleasing digit. However, blooming can lead to a problem denoted "edge ghosting".

In a black and white electrophoretic display, such as found in many eReaders, an area of blooming is not a uniform white or black but is typically a transition zone where, as one moves across the area of blooming, the color of the medium transitions from white through various shades of gray to black. Accordingly, an edge ghost will typically be an area of varying shades of gray rather than a uniform gray area, but can still be visible and objectionable, especially since the human eye is well equipped to detect areas of gray in monochrome images where each pixel is supposed to be pure black or pure white.) In some cases, asymmetric blooming may contribute to edge ghosting. "Asymmetric blooming" refers to a phenomenon whereby in some electro-optic media (for example, the copper chromite/titania encapsulated electrophoretic media described in U.S. Pat. No. 7,002,728, which is incorporated herein in its entirety) the blooming is "asymmetric" in the sense that more blooming occurs during a transition from one extreme optical state of a pixel to the other extreme optical state than during a transition in the reverse direction; in the media described in this patent, typically the blooming during a black-to-white transition is greater than that during a white-to-black one.

The deficiencies in images caused by edge ghosting are exacerbated when a color filter array is added above the layer of black and white electrophoretic medium, such as is done with Kaleido™ displays manufactured by E Ink Holdings, Hsinchu, Taiwan. (A Kaleido™ display is formed by directly applying color filters to an electrophoretic medium layer formed from microcapsules containing black and white electrophoretic particles dispersed in a non-polar solvent. See e.g., U.S. Pat. No. 9,170,467, incorporated by reference in its entirety.) In such CFA-EPD displays, an edge ghost can result in a different shade of red, green, or blue if a particular pixel is associated with a color filter. Such edge ghosts not only result in the red, green, blue colors being slightly "off" but in aggregate, the edge ghosting can result in dithered colors that are different shades from the desired dithered colors. Also, when, for example, the display is switched from a field of black and white text to a color picture, the edge ghosting can result in a corduroy texture appearing in fields of solid colors. Both of these color-edge-ghosting phenomena are detrimental to the final product. As such, driving methods that also reduces the ghosting or blooming effects, both for black and white, and for color are needed.

BRIEF DESCRIPTION OF DRAWINGS

The patent or application file contains at least one drawing executed in color. Copies of this patent or patent application publication with color drawing(s) will be provided by the Office upon request and payment of the necessary fee.

The drawings described below depict one or more implementations in accord with the present concepts, by way of example only, not by way of limitations. In the drawings, like reference numerals refer to the same or similar elements.

DETAILED DESCRIPTION

Figure 1:
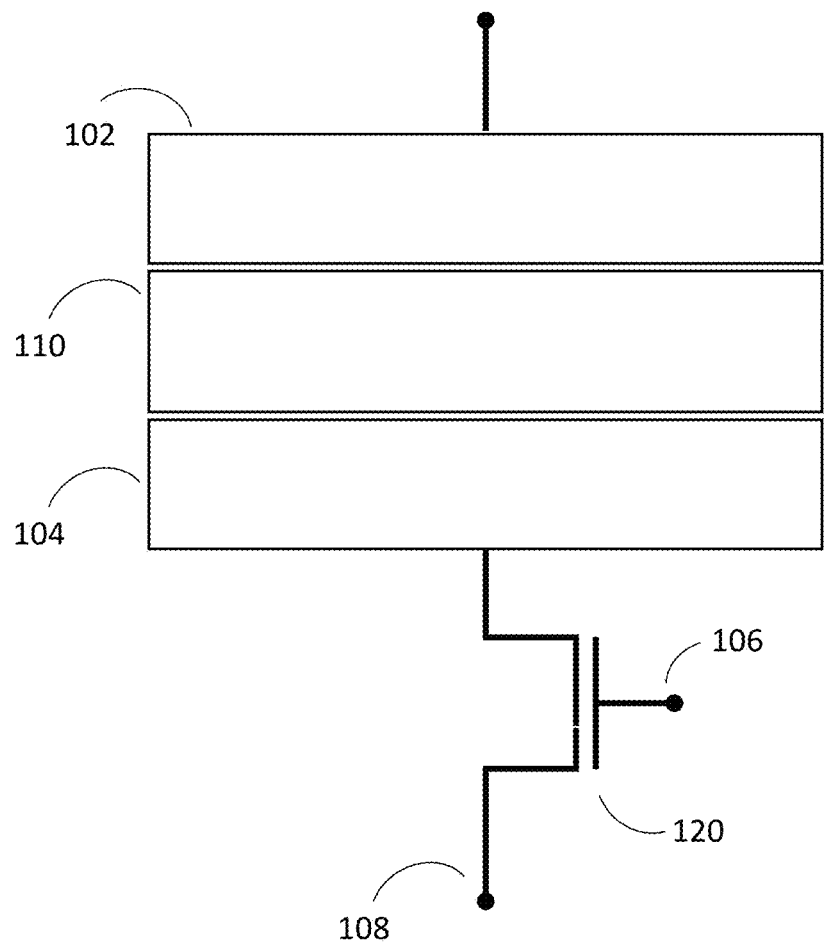
FIG. 1 is a circuit diagram representing an electrophoretic display.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to affect the transition from one specific initial gray level to a specific final gray level. Typically, such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to affect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564.

(h) Applications of displays; see for example U.S. Pat. Nos. 7,312,784; 8,009,348;

(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and (j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/

0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to SiPix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in U.S. Pat. No. 7,420,549, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary, and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again, the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As is known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

An Exemplary CFA-EPD

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles. In most of the following descriptions, the imaging film 110 incudes microcapsules dispersed in a polymeric binder (i.e., a solid imaging layer) wherein the microcapsules include black and white charged pigments dispersed in a non-polar solvent.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written. In some embodiments, the row-by-row addressing is controlled by a controller, which may be a commercially-produced microchip electrically coupled to, e.g., the column drivers and the row selectors (a.k.a. gate drivers) to coordinate application of the correct electric voltage to the pixel 100.

Figure 2:
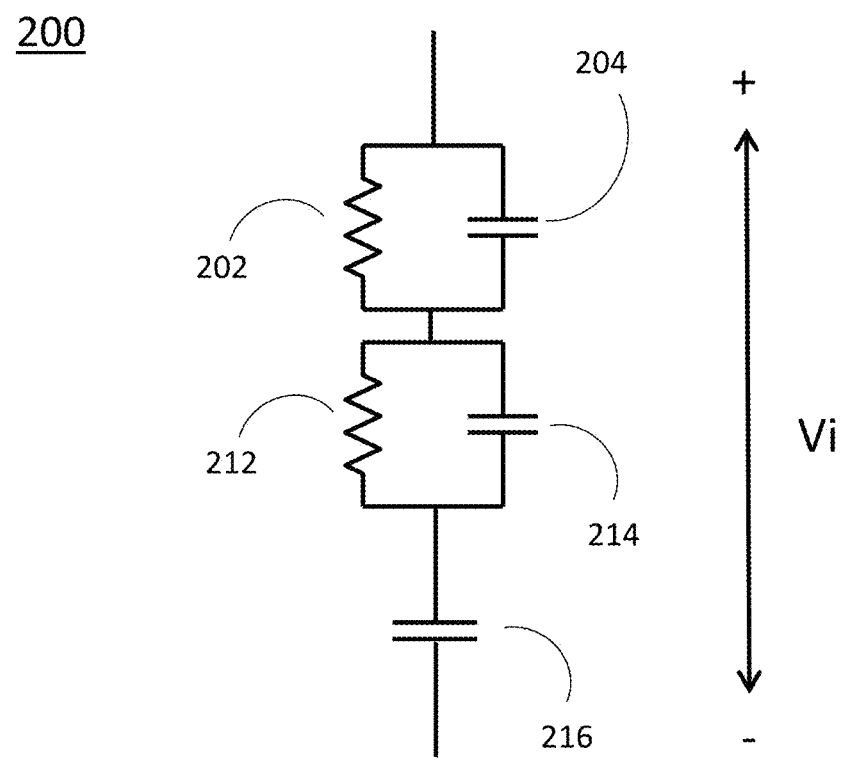
FIG. 2 shows a circuit model of the electro-optic imaging layer.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

In use, it is desirable for an electro-optic display as illustrated in FIG. 1 and FIG. 2 to update to a subsequent image without flashing the display's background. However, the straightforward method of using an empty transition in image updating for a background color to background color (e.g., white-to-white, or black-to-black) waveform may lead to the build-up of edge artifacts (e.g., bloomings). In a black and white electro-optic display, the edge artifacts may be reduced top off waveforms. However, in an electro-optic display such as an electrophoretic display (EPD) with colors generated using a color filter array (CFA), maintaining color quality and contrast may be challenging sometimes.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 3:
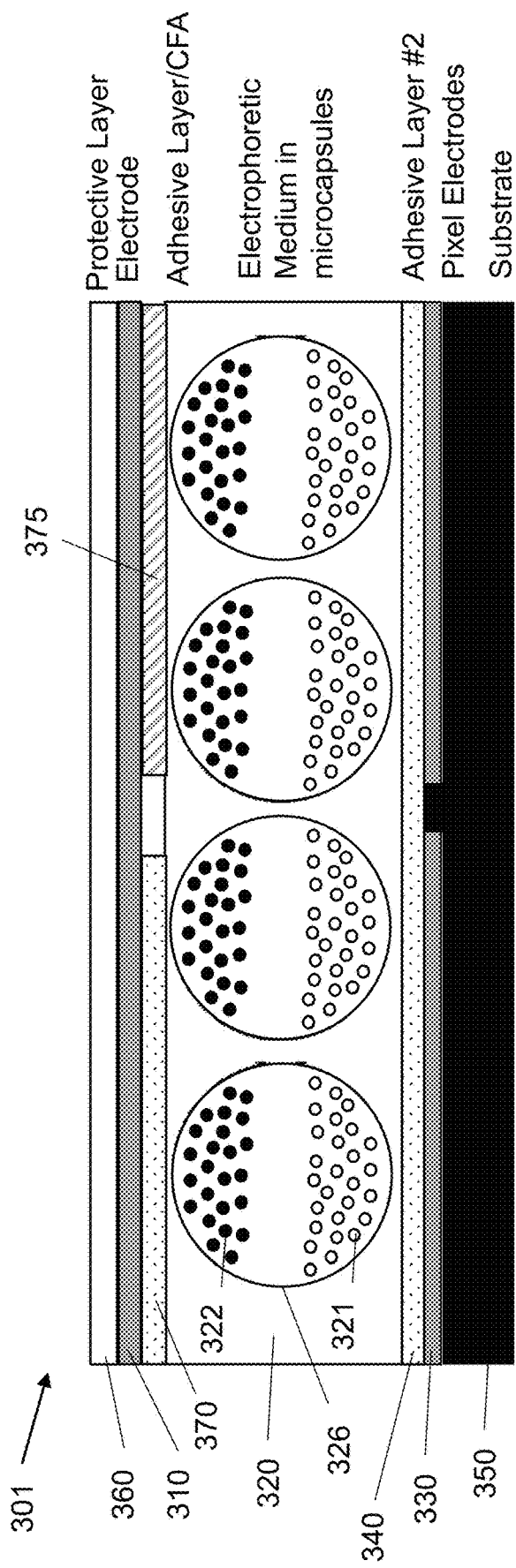
FIG. 3 illustrates an encapsulated electrophoretic display including a color filter array above the capsules including black and white charged pigment particles.

Regarding FIG. 3, an electrophoretic display 301 typically includes a top transparent electrode 310, an electrophoretic medium 320, and a bottom electrode 330, which is often a pixel electrode of an active matrix of pixels controlled with thin film transistors (TFT), discussed in greater detail above. The electrophoretic medium 320 contains at least one electrophoretic particle 321, however a second electrophoretic particle 322, or a third electrophoretic particle, a fourth electrophoretic particle, or more particles is feasible. The electrophoretic medium 320 typically includes a solvent, such as isoparaffins, and may also include dispersed polymers and charge control agents to facilitate state stability, e.g. bistability, i.e., the ability to maintain an electro-optic state without inputting any additional energy.

The electrophoretic medium 320 is typically compartmentalized such by a microcapsule 326, however alternative constructions such as microcell (not shown) may be substituted. The entire display stack is typically disposed on a substrate 350, which may be rigid or flexible. The electrophoretic display 301 typically also includes a protective layer 360, which may simply protect the top electrode 310 from damage, or it may envelop the entire electrophoretic display 301 to prevent ingress of water, etc. Electrophoretic display 301 may also include one or more adhesive layers 340 and 370 as needed. In some instances, a color filter layer 375 may be applied to the adhesive layer 370 as described below with respect to FIG. 4. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

Figure 4:
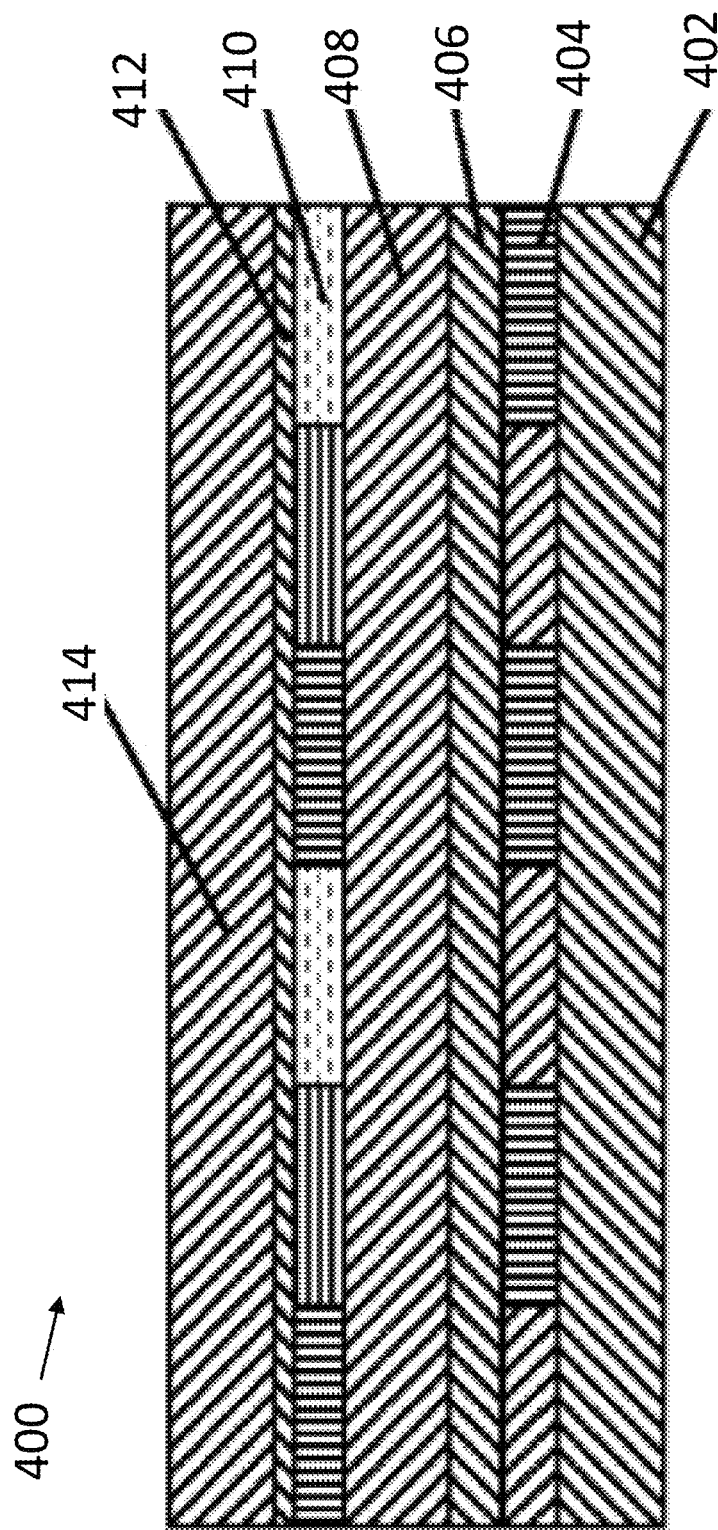
FIG. 4 illustrates a cross sectional view of an electro-optic display having a colored filter array.

FIG. 4 illustrates a cross sectional view of a CFA based colored electrophoretic display (EPD) in accordance with the subject matter disclosed herein. As shown in FIG. 4, a color electrophoretic display (generally designated 400) comprising a backplane 402 bearing a plurality of pixel electrodes 404. To this backplane 402 may be laminated a dual release front plane laminate, this dual release front plane laminate may comprise an electrophoretic medium layer 406 having black and white extreme optical states, and an adhesive layer 408 that is exposed after removal of a release sheet (not shown). A color filter array 410 having red, green and blue areas aligned with the pixel electrodes 404 can be applied directly to adhesive layer 408 using, for example, an ink jet printer. After the color filter array 410 is applied on the adhesive layer 408 a substantially transparent conductive layer 412 (typically formed from indium-tin-oxide sputtered on a thin film of PET) and a front protective layer 414 to protect the substantially transparent conductive layer 412 and to provide a moisture barrier.

A CFA-based colored EPD 400 will produce all colors by modulating the pixels behind each CFA element. For example, the best red color is obtained when the red CFA pixels are turned on (e.g., turned to white) and the green and blue CFA pixels are turned off (e.g., black). It is understood that the color-subpixel pattern may include some amount of white, i.e., non-colored, area in order to boost the white state of the CFA-based colored EPD 400. For example, there can be red, green, blue, and white subpixels at each pixel area. (Typically, each colored subpixel is approximately the size of a pixel electrode on the backplane, however color filter elements may be chosen that span more than one pixel electrode.) With the addition of front light guide and low-power LED lighting, the brightness of the resulting display can be boosted sufficiently to achieve a good color gamut with typical indoor lighting.

Figure 5:
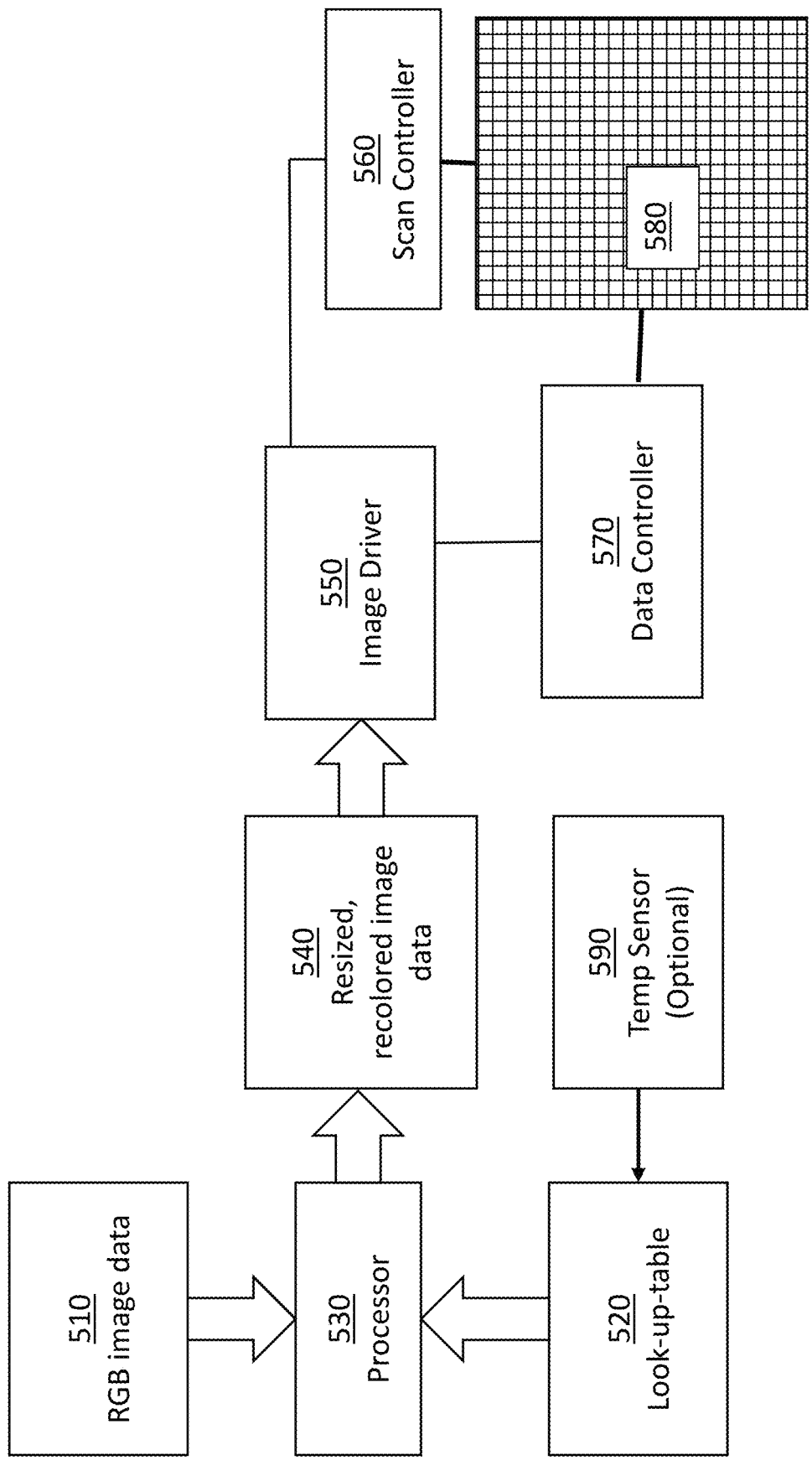
FIG. 5 illustrates image file processing from RGB image data to display on an encapsulated electrophoretic display with a color filter.

The methods for converting a standard RGB image, such as used for display on an LCD monitor, into a CFA-EPD image are now described with respect to FIG. 5. The system includes storage media, for example non-transitory memory, for example recordable magnetic media or random-access memory that can store image data for some length of time. The image data typically includes a two-dimensional image with colors assigned to specific locations in an x-y plane, i.e., pixels. Often the image data is in a raster format that identifies each pixel by a row and column location. In practice, the RGB image data may be in any of a number of compressed image formats such as jpeg, tiff, png, pdf, or some other format. It is understood that the compressed file may be uncompressed during the transformation. Where the RGB image data is described as including 4-bit or greater RGB colors, it is understood that the colors correspond to a gamut of at least 4096 colors, that is each red, green, or blue pixel is assumed to have 16 or more gray levels ($2^4$=16), i.e. 4-bits per channel. In some technical literature this may be referred to as 12-bit color ($2^{12}$=4096; 16×16×16=4096). Suitable look-up-tables can be constructed for higher color levels, such as 5-, 6-, or 8-bit-per-channel colors.

The RGB image data begins in a first storage medium 510 that is operatively coupled to a processor 530 so that the processor 530 can access the RGB image data. The processor 530 can be a specialty processor such as an i.MX 6 Series image processor from NXP Semiconductor (Eindhoven, The Netherlands) or the processor 530 can be a personal computer or other computing platform configured to resize, modify, and reassign pixel colors to the RGB image data. As part of the reassignment calculations, the processor 530 will access a look-up-table (LUT) 520 that correlates 4-bit or greater RGB colors to specific combinations of the at least three non-white subpixels and the white subpixel (wherein the subpixels have only an "on" state and an "off" state). If necessary, upon receiving the RGB image data from the first storage medium 510, the processor will resize the image data based upon the size of the pixel of the display including at least three non-white subpixels and a white subpixel, wherein each of the three non-white subpixels has a different color, and wherein each of the subpixels has only an "on" state and an "off" state. (For example, if at least three non-white subpixels and a white subpixel are larger in area than the underlying pixel electrodes that are driving the transition, this pixel may be referred to as a "super pixel." For example, the display medium beneath a color filter array may have 300 pixel electrodes per inch, however, each colored subpixel in the color filter array may actually only provide 40 super pixels per inch. Thus, "super pixel" should be interpreted as a subset of "pixel.")

In many instances, the RGB image data will contain information for many more pixels that what can be shown on the display. This also happens when, e.g., converting image data from high resolution digital cameras, where there is far more information across the image than can be displayed. Accordingly, a first step will be to resize the RGB image to conform to the number of available pixels/super pixels. Typically, this step involves binning portions of the RGB data into bins corresponding to the number and location of the super pixels. In some embodiments, the RGB colors of the binned data will be averaged to assign an RGB color to the binned data, or a median color can be identified among the resized RGB image data. The palette could be corrected for white point and black point if desired or distorted to handle color cast or shift. After resizing, the resized RGB data can be gamma corrected and/or sharpened using known techniques. For example, the resized data can be sharpened with an algorithm using Laplacian operators. Once these steps are completed, the processor 530 will match the resized data color to the measured colors of the super pixels by comparing the colors of the resized data to the look-up-table 520. Using the look-up-table, the processor 530 assigns each unit of resized RGB data a color corresponding to a specific combination of the colored subpixels. In other embodiments, the measured specific combinations are converted into L*a*b* data, which is then mapped into sRGB space using known algorithms.

Once the processor 530 has assigned specific combinations to the resized data, the data is written to a third storage medium 540 where it is held until it is sent to an image driver 550 that coordinates the activation of the various scanning and data lines that are ultimately responsible for switching the electro-optic pixels of an active matrix 580 from an "off" state to an "on" state to produce an image. While FIG. 5 shows an active matrix 580, it is understood that the principles of the invention can be used to transform colors for display on an electro-optic medium driven by segmented displays, indirectly drive displays, etc.

At the same time the processor 530 assigns new colors to the resized data, the processor 530 may also dither the resized data to improve the perception of the final image. Such dithering is well-known in the printing arts. When a dithered image is viewed at a sufficient distance, the individual colored pixels are merged by the human visual system into perceived uniform colors. Because of the trade-off between color depth and spatial resolution, dithered images, when viewed closely, have a characteristic graininess as compared to images in which the color palette available at each pixel location has the same depth as that required to render images on the display as a whole. However, dithering reduces the presence of color-banding which is often more objectionable than graininess, especially when viewed at a distance.

Algorithms for assigning particular colors to particular pixels have been developed in order to avoid unpleasant patterns and textures in images rendered by dithering. Such algorithms may involve error diffusion, a technique in which error resulting from the difference between the color required at a certain pixel and the closest color in the per-pixel palette (i.e., the quantization residual) is distributed to neighboring pixels that have not yet been processed. European Patent No. 0677950 describes such techniques in detail, while U.S. Pat. No. 5,880,857 describes a metric for comparison of dithering techniques. U.S. Pat. No. 5,880,857 is incorporated herein by reference in its entirety. This set of points may be arbitrarily transformed in order to facilitate the dithering that is used to render the colored image. For example, the sRGB values of the measured primaries may be moved closer to the target points in the source space. The target image in the source space may also be transformed, for example by being linearly scaled to correspond to the measured black and white states of the display (i.e., each point in the image may be normalized to the measured dynamic range of the display). Following such transformations, the three-dimension color image dithering may be performed using algorithms that are known in the art, such as Floyd-Steinberg dithering. Other dithering techniques, such as blue-noise mask dithering may also be used.

It has been observed that the measured colors of the specific combinations of subpixels may vary with temperature. In the instance of an electro-optic display including an electrophoretic medium, the temperature variations may result from changes in the white state reflectivity with temperature. This shift may cause the look-up-table to require a different set of RGB colors to be associated with the specific combination of subpixel colors. Thus, in some embodiments, a CFA-EPD 400 includes a temperature sensor 590. A temperature reading from the temperature sensor 590 may be the basis for selecting a temperature-dependent look-up-table. In alternative embodiments, the electro-optic medium may be limited to a 1-bit subpixel color in some temperature regimes but may allow higher color levels at other temperatures. In these embodiments, the look-up-table may be expanded based upon the temperature. For example, if an electrophoretic display has 2-bit subpixels at room temperature, but only 1-bit subpixels at high temperatures, the temperature data can cause a processor to switch from a look-up-table that maps 256 specific combinations of subpixel colors onto the RGB palette to a look up table described above, i.e., that maps 166 specific combinations of subpixel color onto the RGB palette.

Of course, blooming and pixel coupling still influence the final image of the CFA-EPD 400. Importantly, any blooming into the white pixels (if present) may cause a reduction in the chromaticity and brightness of the red color. Furthermore, rendered images may be sensitive to differential blooming ghosting. Also, fringing fields of a switching pixel may impact the optical state of the neighboring pixels. For example, in dithered images there are pixel-level size patterns, with pixels going to quite different optical states. Or pixels can go to a same optical state from different initial optical states using different waveforms, and as a result pixels will experience different blooming artifacts and they can get to slightly different final lightness (e.g., ghosting effect). All these blooming artifacts can introduce differential blooming ghosting. Explained in more details below are algorithms where one may identify and reduce the above mentioned edge artifacts (e.g., ghosting and/or blooming).

EPD Driving Schemes

In many instances, the underlying color control is a matter of delivering the correct voltage to achieve the desired gray scale at a given color subpixel. Nonetheless, drive schemes have to consider more than just the final gray level, such as the previous one (or more) gray scale state(s) of the pixel before the update, the length of time of the update, and the "flashiness" of the update. For grayscale (black/white) driving, drive schemes may be divided into global drive schemes (more accurately referred to as a "global complete" or "GC" drive scheme), where a drive voltage is applied to every pixel in the region to which the global update drive scheme is being applied (which may be the whole display or some defined portion thereof), partial update/direct update drive schemes ("DU" drive schemes), where a drive voltage is applied only to pixels that are undergoing a non-zero transition (i.e., a transition in which the initial and final gray levels differ from each other) while no drive voltage is applied to any pixels in the area undergoing zero transitions (in which the initial and final gray levels are the same). For bookkeeping, a drive scheme may also be labeled with the number of graylevels that are available due to the storage and processing capacity of the driving electronics, such as the controller. Thus, a GC scheme for 3-bit driving is GC-8, and a GC scheme for 4-bit driving is GC-16. In some instances, all of the other components (electrophoretic medium, front electrode, backplane) are identical, but because of the cost or power requirements, a lower-bit-level controller is used.

There are also intermediate drive schemes (designated a "global limited" or "GL" drive scheme), which are similar to a GC drive scheme except that no drive voltage is applied to a pixel which is undergoing a zero, e.g., white-to-white or black-to-black transition, however all of the other pixels in the area are undergoing a full GC update. For example, in a display used as an electronic book reader, i.e., displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user. Secondly, when an un-driven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the un-driven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared, e.g., with a proper GC update. Hitherto, such edge effects (and the effects of color drift in un-driven white pixels) have typically been removed by using a single GC update at intervals, e.g., after four updates, e.g., after six updates, e.g., after eight updates, e.g., after 12 updates, e.g., after 20 updates. Unfortunately, using GC updates at intervals reintroduces the problem of a "flashy" update, and indeed the flashiness of the update may be heightened by the fact that the flashy update only occurs at long intervals, which some users find distracting.

When an electrophoretic display is controlling color through a color filter, as described above, the color drift is even more noticeable, requiring GC updates more frequently for CFA-EPD than for "typical" EPDs, which are only grayscale. Additionally, when switching between black and white and CFA-color images, such as in an eReader with color pictures, the blooming due to prior state grayscales will manifest as very obvious ghosting. Indeed, in many CFA-EPDs there is a separate button on the screen for the express purpose of causing a GC update to take place in order to clear ghosting and to improve the dithered colors. In many instances, the increased sensitivity to ghosting/blooming/edge effects requires further modifications to the existing black and white drive schemes. In such instances, the drive schemes are often labeled with an extra "C" for Color. Accordingly, the GC16 waveforms become GCC16 when modified for use with CFA-EPD.

Ghosting and/or Blooming Reducing Waveforms for CFA EPD

Figure 6:
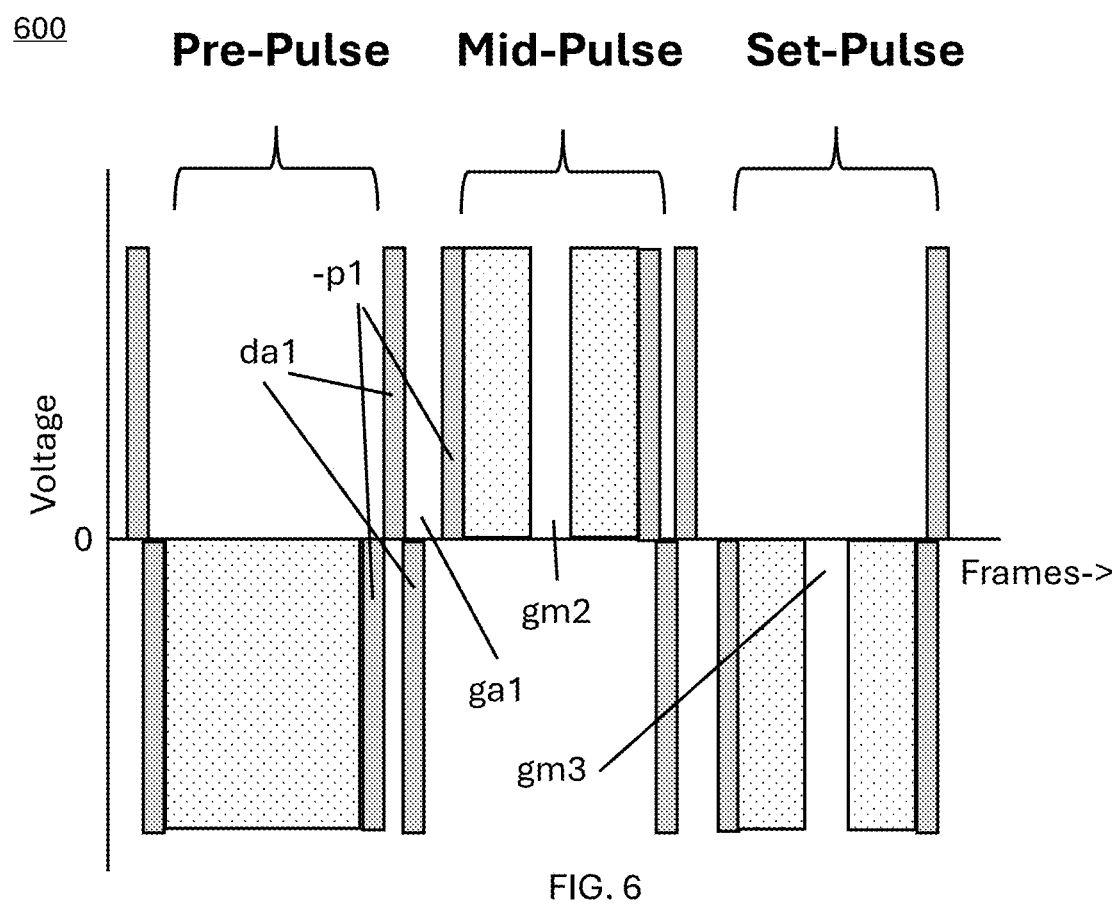
FIG. 6 illustrates an exemplary waveform configured to reduce blooming and/or ghosting effects in display pixels.

Shown in FIG. 6 is an exemplary waveform 600 tuned for minimal areal ghosting by adjusting the pre-pulse portion using the p1 parameter. (A waveform is a series of voltages applied to a given display pixel over some number of active-matrix update times, i.e., "frames." It is understood that the voltage is relative, but a typical waveform voltage is ±15V, corresponding to voltage difference between the top-light transparent electrode and the pixel electrode.) The waveform of FIG. 6 may be, for example, part of a 4-bit drive scheme, i.e., resulting in 16 different gray levels being available. As shown in FIG. 6, the solid gray bars represent the starting (or ending) time of voltage pulses applied to the display pixel, whereas the dotted-fill areas represent the potential time width of the pulses, where the dotted-fill areas can be varied from zero to many frames. Waveform 600 may have a first pre-pulse portion that drives a display pixel to a first extreme optical state using, for example, a top off pulse of negative magnitude. Subsequently a mid-pulse may be applied, consisting of two top-off pulses of positive magnitude, driving the display pixel to an optical extreme opposite to that of the pre-pulse portion. The two pulses of the mid-pulse portion may be separated by a gap (V=0V) of duration gm2, where gm2 can be variably defined depending on application needs. Furthermore, the mid-pulse portion may be followed with a set-pulse portion. The set-pulse portion may include two top-off pulses of the negative magnitude, opposite of that to the mid-pulse portion. The set-pulse portion can be designed to drive the display pixel to an optical extreme opposite to that of the mid-pulse portion. The two negative top-off pulses of the set-pulse portion may be separated by a gap gm3, where gm3 can be variably defined depending on application needs.

Figure 7:
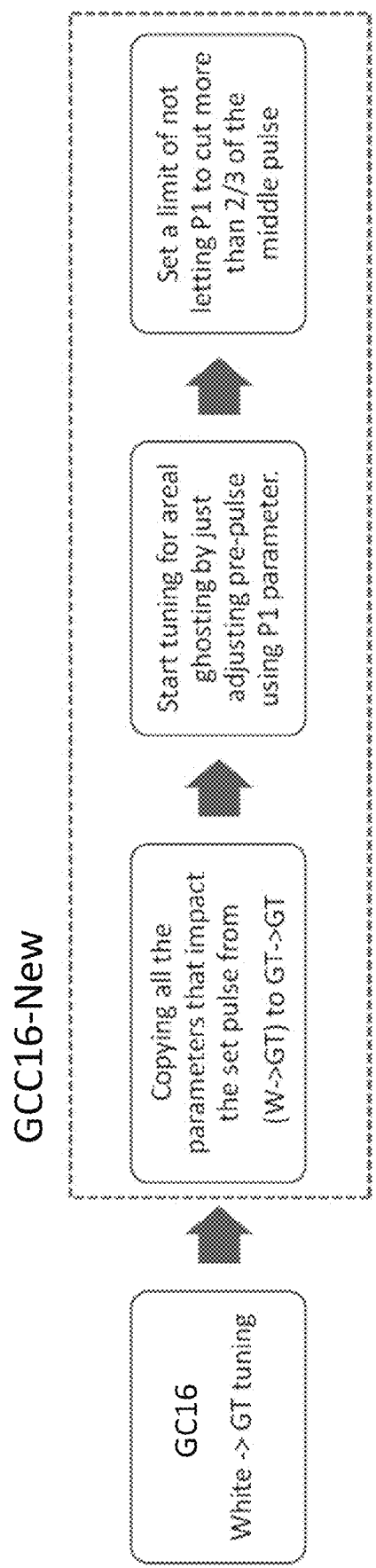
FIG. 7 illustrates a tuning method for reducing blooming and/or ghosting in EPD.

One embodiment of a tuning method 700 for minimizing differential blooming with a waveform 600 of FIG. 6 is shown in FIG. 7. Beginning from a GC16 set of waveforms for black-white gray level driving, adjustments are made to compensate for the CFA interactions as described above, therefore producing GCC16. For the new waveform set, however, all the parameters that define the set pulses (i.e., the last part of the waveforms) for graytone-to-graytone transitions are replaced with the white to graytone tuning step (e.g., graytone placement; a.k.a. GTP tuning), which is appropriate for driving from a white pixel to the desired gray level. Thereafter, ghosting tuning is performed by tuning the widths of the pre-pulses while leaving the set pulses as defined by the white to graytone waveforms. Next, by varying p1 and ga1 (i.e., as illustrated in FIG. 6) the "flash" of the transition (now requiring the pixel to transition through the white state) can be reduced. Thus, the p1 and ga1 are simplified to improve overall performance (see FIG. 8). Of course, the middle pulse is still important for DC balance, and to minimize differential blooming, the ink needs to compensate for the transition to the white state by, for example briefly driving to black in mid-pulse. (DC balanced waveforms have an aggregate impulse (Voltage×time) of zero.) Nonetheless, the p1 parameter is locked to not remove more than ⅔ of the mid pulse. The resulting drive scheme is known as GCC16 New. Essentially, by setting all of the set pulses to the white-to-graytone of GCC16, each pixel now "visits" the white state on the way to a final display state, even when the actual transition is graytone 1->graytone 2.

Remarkably, by transferring the set pulses from GCC16 and modifying the GCC16 waveforms by allowing p1 and ga1 to take up some portion of the middle pulse, the resulting simplified GCC16-New waveforms are both faster and less flashy. While it is not entirely clear why this is the case, it is theorized that the CFA in combination with the extra illumination from the front light "washes out" some of the visual "snap" that is experienced with the high contrast black and white pigment alone, making the difference between the GCC16 drive forms and the GCC16-New waveforms less pronounced visually, but allowing for shorter waveforms and faster updates. Additionally, as explained below, the GCC16-New waveforms also have a more reliable color gamut which is virtually independent of the prior state of the pixel.

Figure 8:
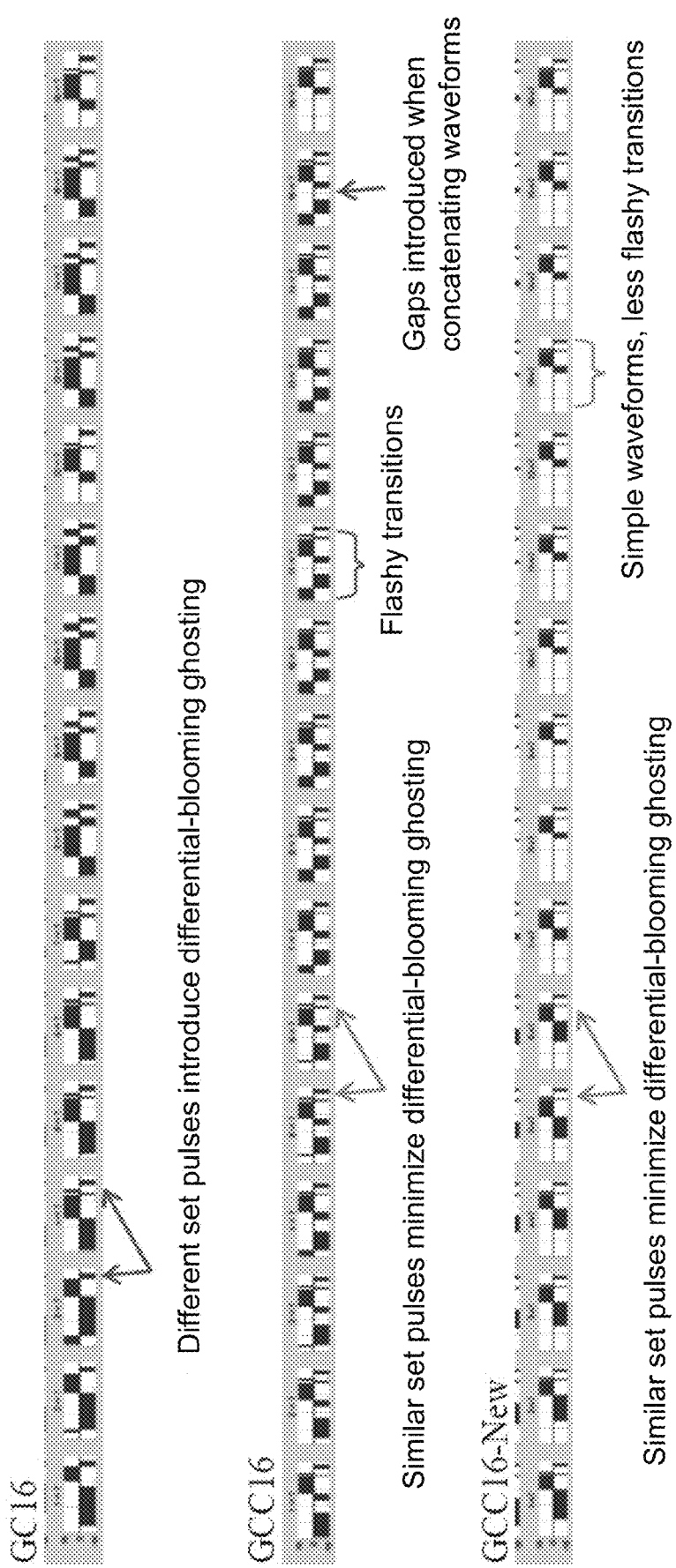
FIG. 8 illustrates the difference between the GC16, the GCC16 and the GCC16-New driving modes.

FIG. 8 illustrates the different driving modes GC16, GCC16 and GCC16-New for comparison. For each drive mode, the 16 drive schemes to the corresponding seventh gray level are illustrated, the left-most being from the darkest state and the right-most being to the lightest (i.e., most color) state. The GCC16-New mode is simpler and faster to implement to achieve minimal differential blooming and areal ghosting without introducing major changes into current software and/or color rendering algorithms (described above). The GCC16-New drive scheme also improves graytone-to-graytone transition appearance and minimizes differential blooming and ghosting compared to GC16 and GCC16. Furthermore, the tuning method 700 presented in FIG. 7 also decreases the shorting time (allowing pixel electrode and top electrode to equilibrate) in the middle of the waveform that is required in GCC16 waveforms. The method 700 also minimizes white state differences between GCC16 mode and GC16/GL16 modes, further decreasing the ghosting when switching between GCC16 and GL16 modes due to empty white-to-white transitions in GL16 mode. Such GC16/GL16 to GCC16 transitions and vice-versa are especially common when displaying time tables in outdoor signage, where it may be typical to provide a black and white table of text and then a full color image (i.e., and advertisement) and back again.

Figure 9A:
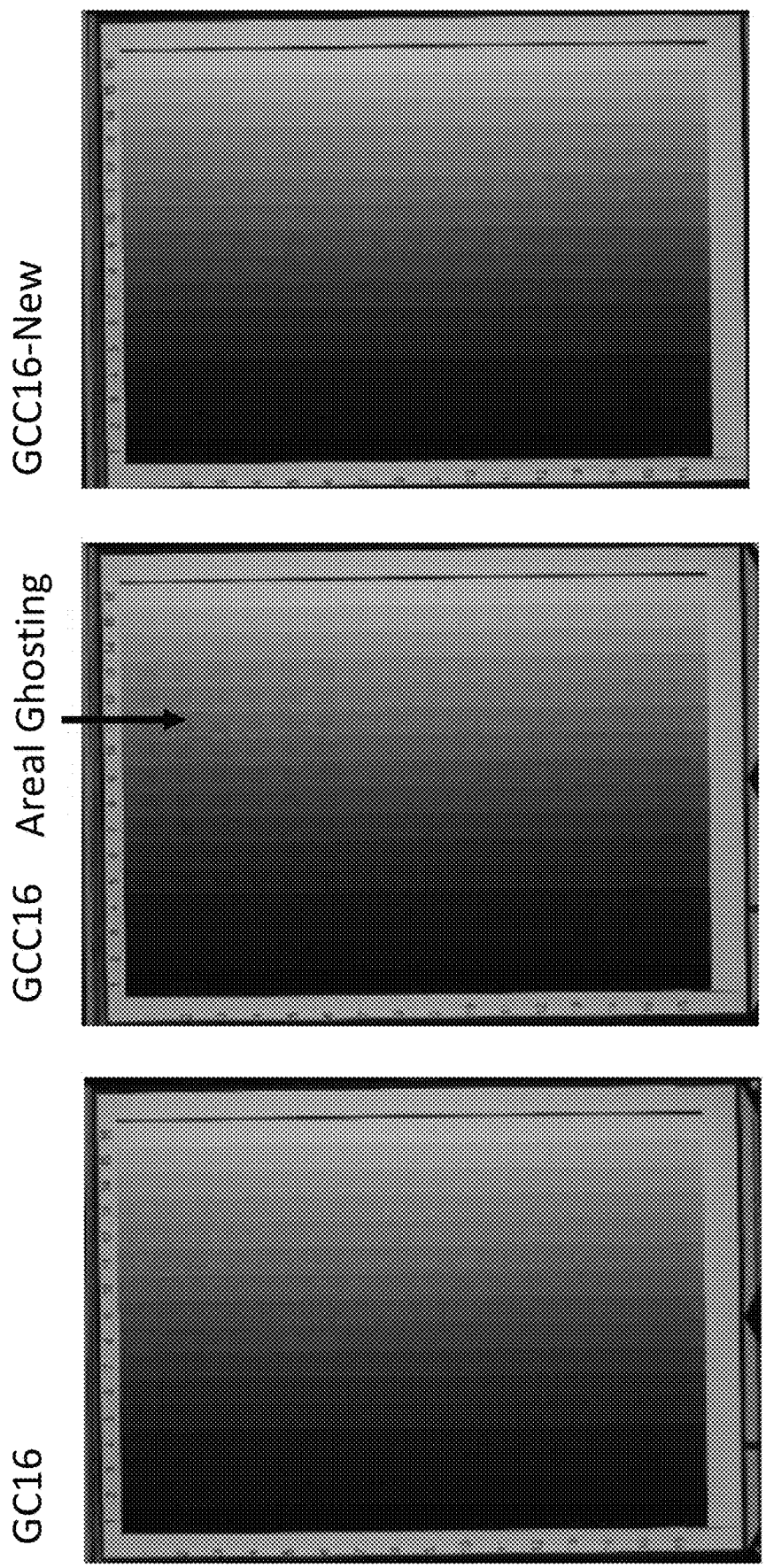
FIG. 9A-9C illustrate a reduction in areal ghosting by using the GCC16-New mode.
Figure 9B:
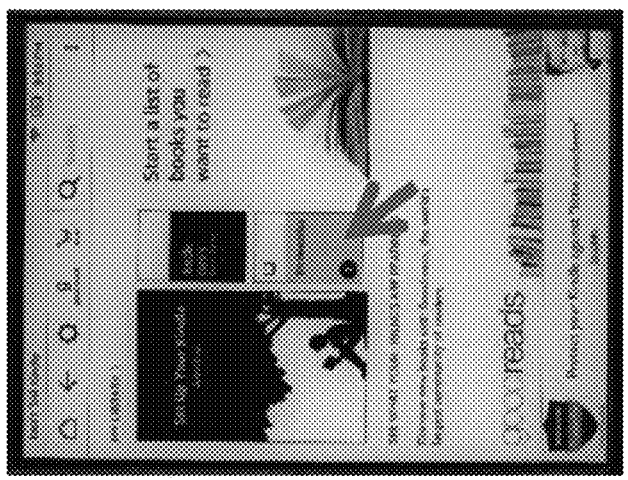
Figure 9B:
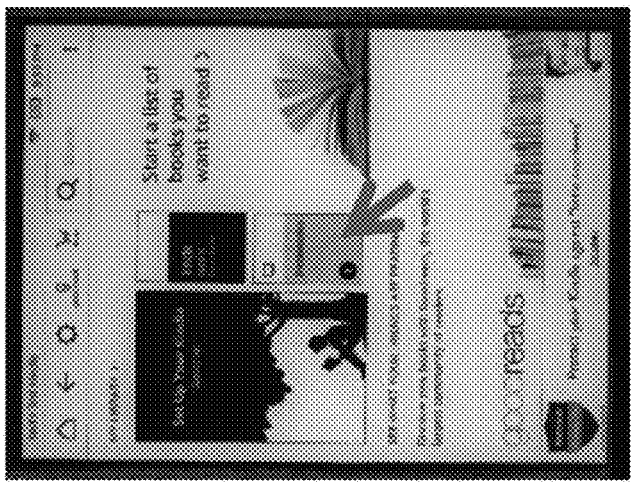
Figure 9B:
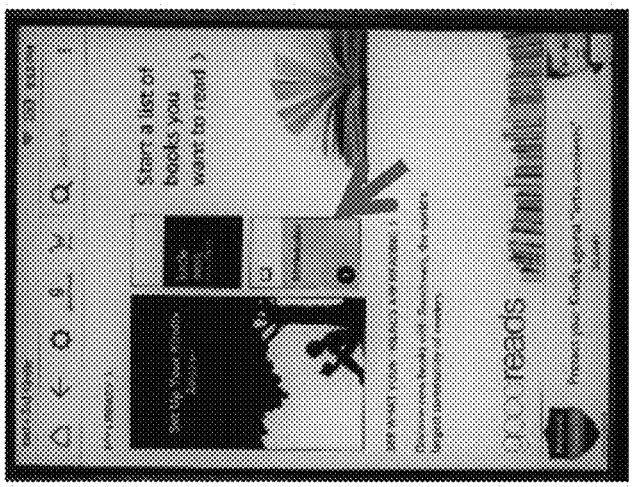
Figure 9C:
Figure 9C:
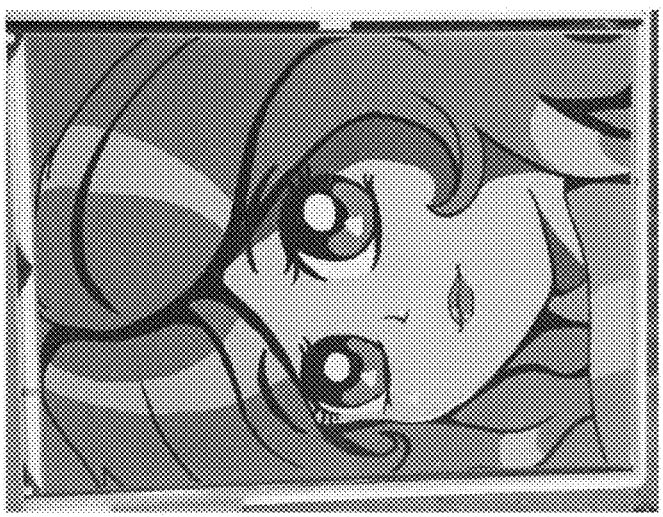
Figure 9C:
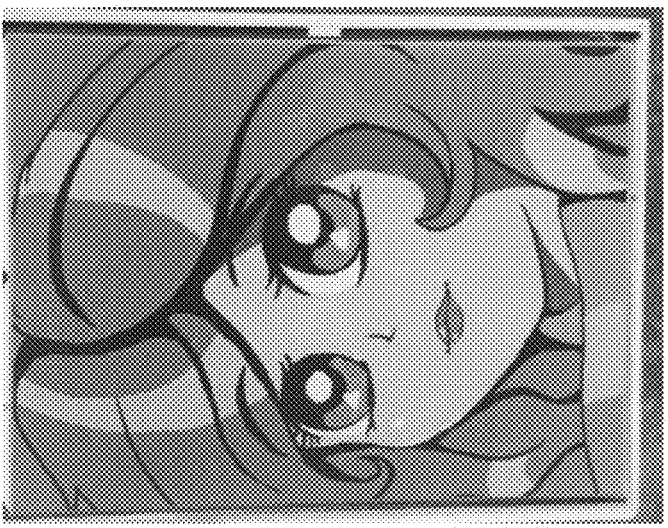

FIG. 9A and FIG. 9B illustrate that the GCC16-New mode successfully reduces areal ghosting compared to the GC16 and GCC16 modes when used in a grayscale electrophoretic display (i.e., without color filter). When coupled with a CFA, as shown in FIG. 9C, the areal ghosting is not as prominent, but when a color is dithered, the edge ghosting can result in shifts in color, especially flesh tones where the human eye is very sensitive to shade.

Figure 10:
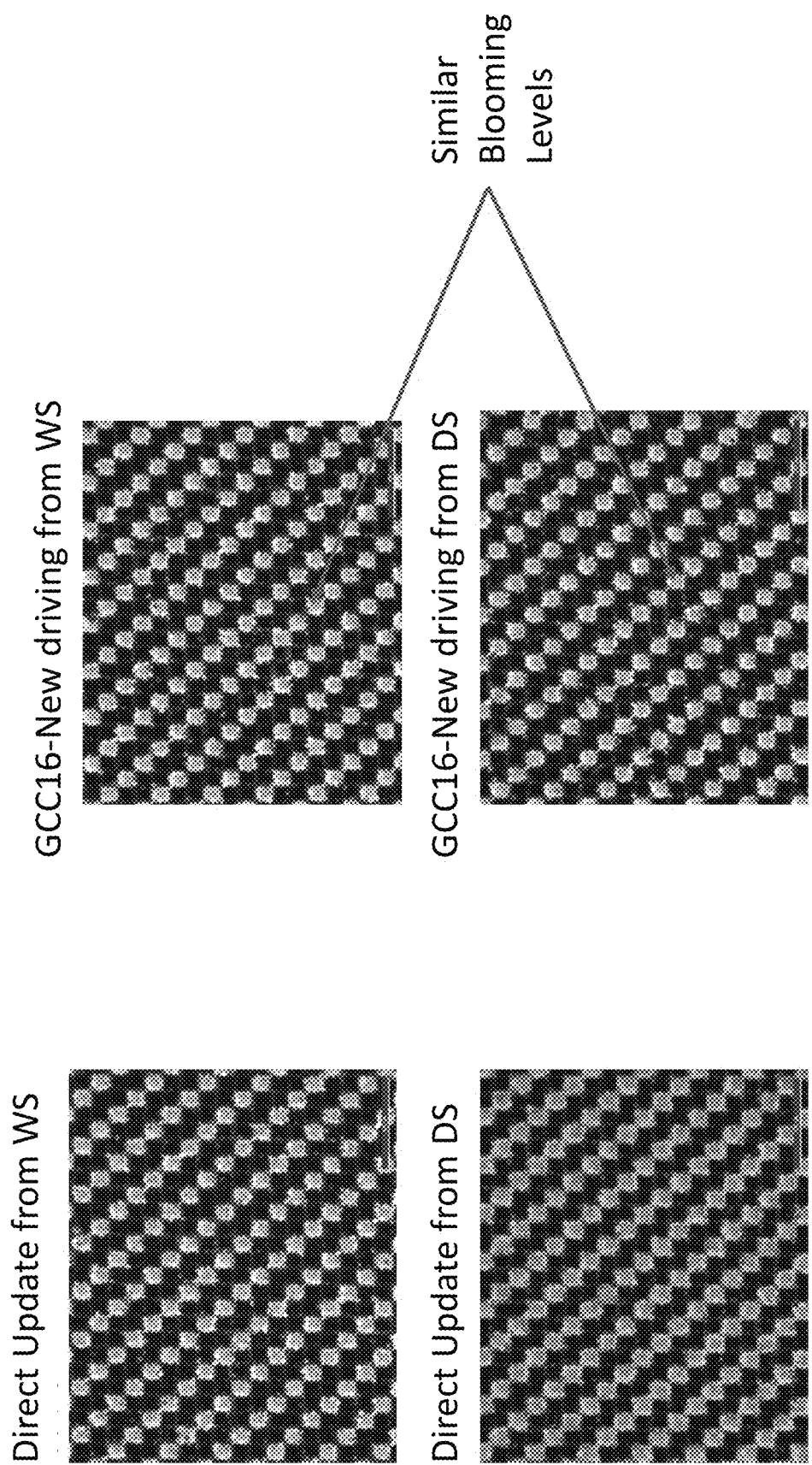
FIG. 10 illustrates a noticeable improvement in differential ghosting by using the GCC16-New mode.

The mechanism for this color shift is seen more clearly under the microscope as shown in FIG. 10. Comparing the fill patterns for a dark green (i.e., red, blue, white subpixels filled) field coming from a white field (WS) and from a black field (DS) with GCC16, it can be seen that there is a color shift depending upon whether the new state originated from the WS or the DS, which was carried over in the set pulse from the GC16 waveforms. (See left panels of FIG. 10.) In contrast, the GCC16-New waveform incorporates the white-to-graytone set pulse, which essentially bring the final transition through the white state, even for graytone-to-graytone updates. As shown on the right side of FIG. 9, the fill factor of the green is much more consistent originating from the WS and the DS, and thus the final color is more consistent.

Figure 11:
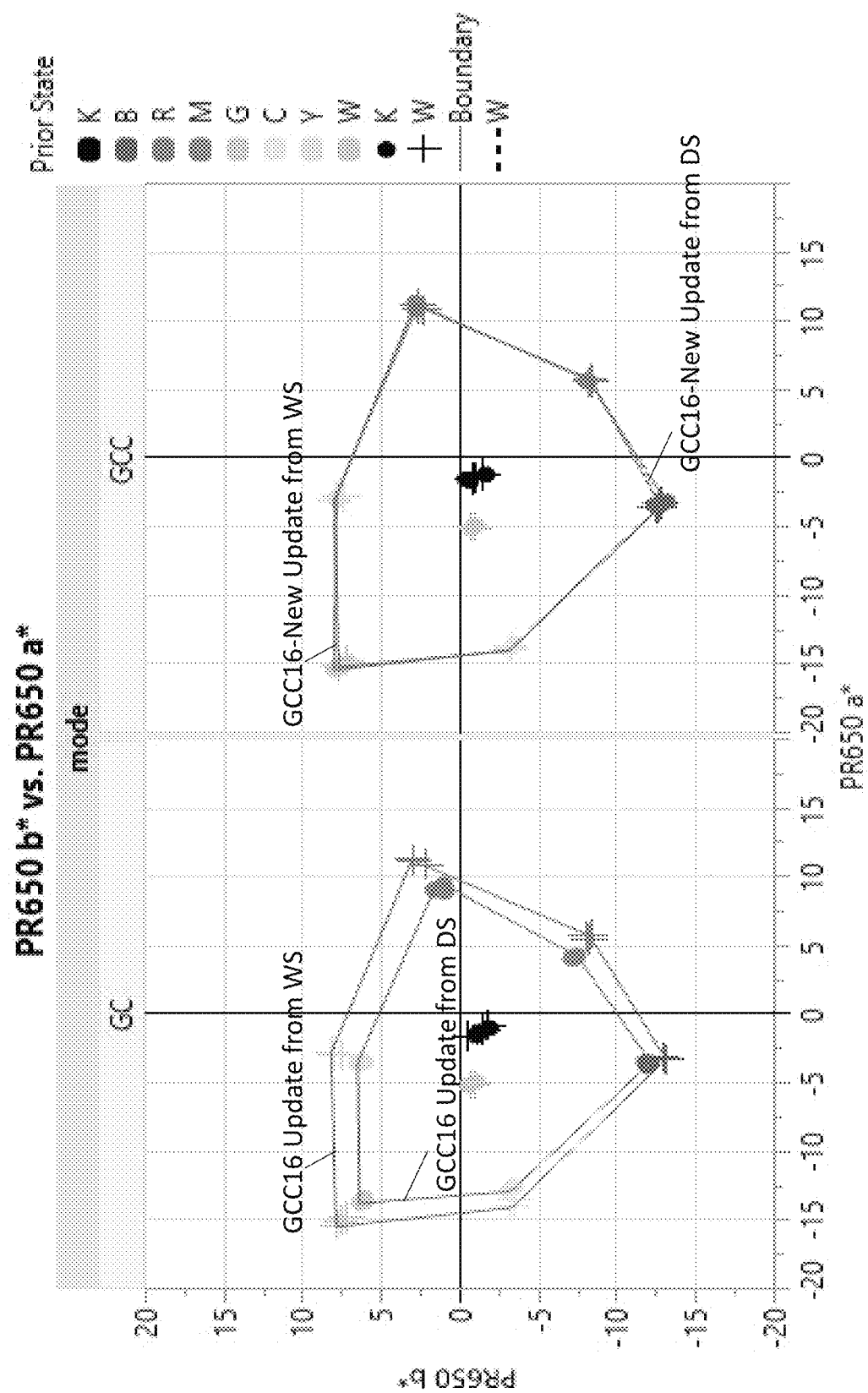
FIG. 11 illustrates improved color gamut with GCC16-New drive scheme.
Figure 12:
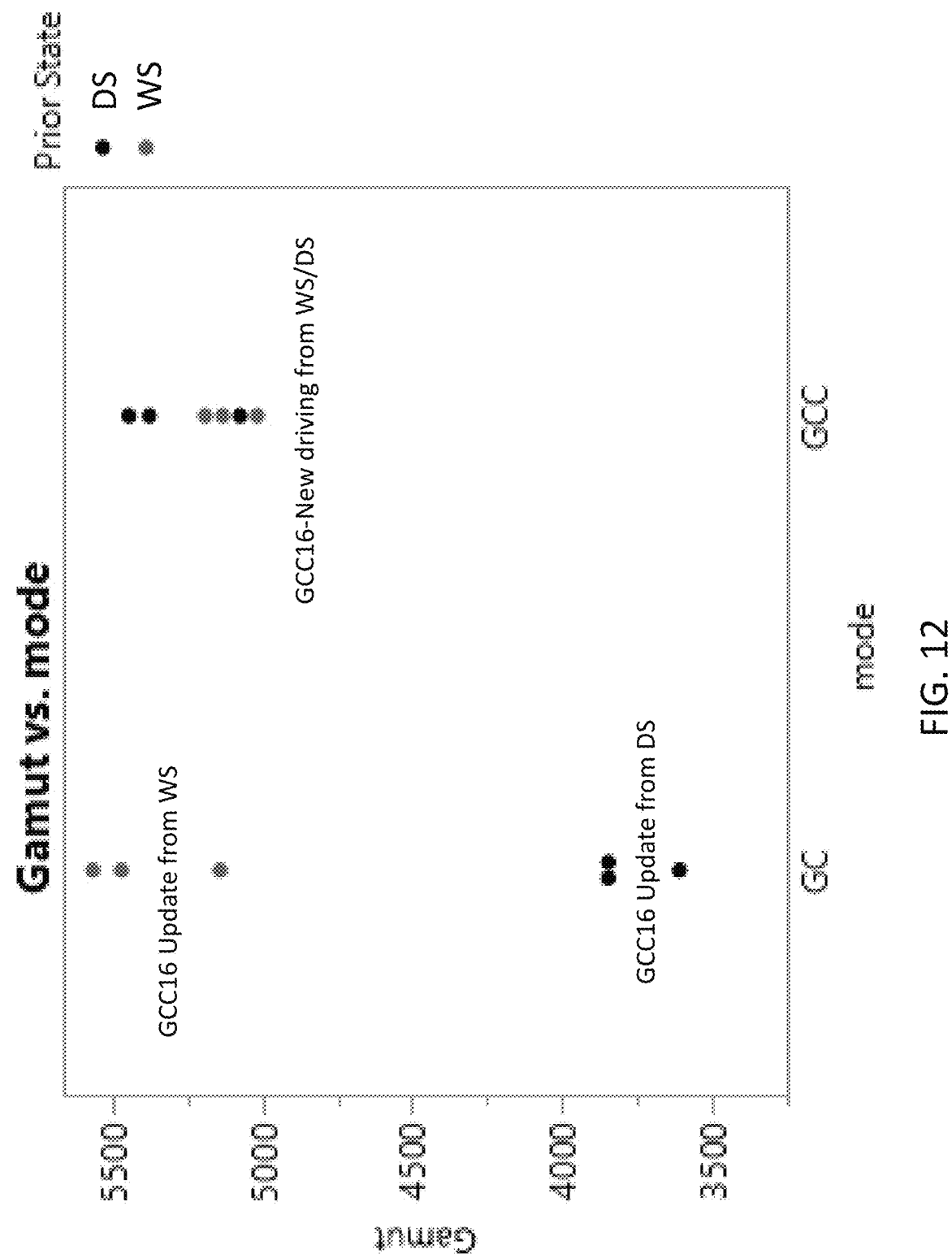
FIG. 12 illustrates consistency of color gamut with GCC16-New drive scheme whether the prior state is black or white.

The improved color consistency due to the GCC16-New waveform was confirmed across all colors by running a CFA-EPD device through a series of color pattern image updates under a calibrated optics bench. The resulting measurements can be used to construct color gamut plots, as shown in FIG. 11. As shown in FIG. 11, when the GCC16 waveform is used, the resulting gamut when beginning from the white state (i.e., all pixels driven to white before the update) is quite a bit larger than the gamut when beginning from the dark state. This result is not surprising in view of the microscope images of FIG. 10. However, when implementing the GCC16-New drive scheme the two gamuts (i.e., from WS, from DS) are virtually indistinguishable. As shown in FIG. 12, however, it is not simply a matter of averaging the two gamuts (i.e., for GCC16 from the WS and for GCC16 from the DS). Implementing the GCC16-New waveform, for the most part, brings the DS to graytone color gamut to the WS to graytone color gamut. The result is better and truer color performance for an electrophoretic display including a color filter above the black and white capsule layer.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving an electrophoretic display including a color filter layer between a viewer and a layer of electrophoretic media, the electrophoretic media comprising black and white charged particles and being addressed by a plurality of display pixels, the method comprising:
updating the display with a first image; and
updating the display with a second image, wherein at least some of the plurality of display pixels are updated to the second image with a waveform comprising a pre-pulse, a mid-pulse, and a set-pulse, wherein the mid-pulse and a portion of the set-pulse cause the white particles to be driven adjacent the color filter layer before a desired color state of the second image is achieved by the remaining portion of the set pulse.

2. The method of claim 1, wherein the desired color state of the second image is not a color state in which the white particles are adjacent the color filter layer.

3. The method of claim 1, wherein the mid-pulse causes the black particles to be driven adjacent the color filter layer before the white particles are driven adjacent the color filter layer.

4. The method of claim 1, wherein the waveform is DC balanced.

5. The method of claim 1, wherein a plurality of waveforms for updating the electrophoretic display including a color filter layer are stored in memory to be accessed by a controller for the display.

6. The method of claim 5, wherein 16 different waveforms are stored in memory for achieving the desired color state of the second image.

7. The method of claim 1, wherein the black and white charged particles are confined within a plurality of microcapsules or microcells.

8. The method of claim 1, wherein the set pulse causes a white-to-graytone transition.

9. A display controller capable of controlling the operation of a plurality of pixel electrodes for an electrophoretic display that includes a color filter layer between a viewer and a layer of electrophoretic medium, the electrophoretic medium comprising black and white charged particles, the controller configured to carry out a driving method comprising:
providing a series of voltages to the plurality of pixel electrodes over an update period, the series of voltages including a pre-pulse, mid-pulses, and set-pulses, wherein the set-pulses cause the white particles to be driven adjacent the color filter layer before achieving a final color state that does not include the white particles adjacent the color filter layer at the plurality of pixels.

10. The display controller of claim 9, wherein the controller additionally causes the black particles to be driven adjacent the color filter layer before the white particles are driven adjacent the color filter layer.

11. The display controller of claim 9, wherein the display controller is operatively coupled to a column driver and a row driver of an active matrix of pixel electrodes.

12. The display controller of claim 9, wherein the display controller is operatively coupled to memory, and the memory stores instructions for the series of voltages to be provided to the plurality of pixel electrodes to achieve the final color state.

13. The display controller of claim 12, wherein the memory stores 16 different sets of instructions for the series of voltages to be provided to the plurality of pixel electrodes to achieve the final color state.

14. The display controller of claim 9, wherein the final color state is a non-white graytone state.

* * * * *